No. 743,796. Patented November 10, 1903.

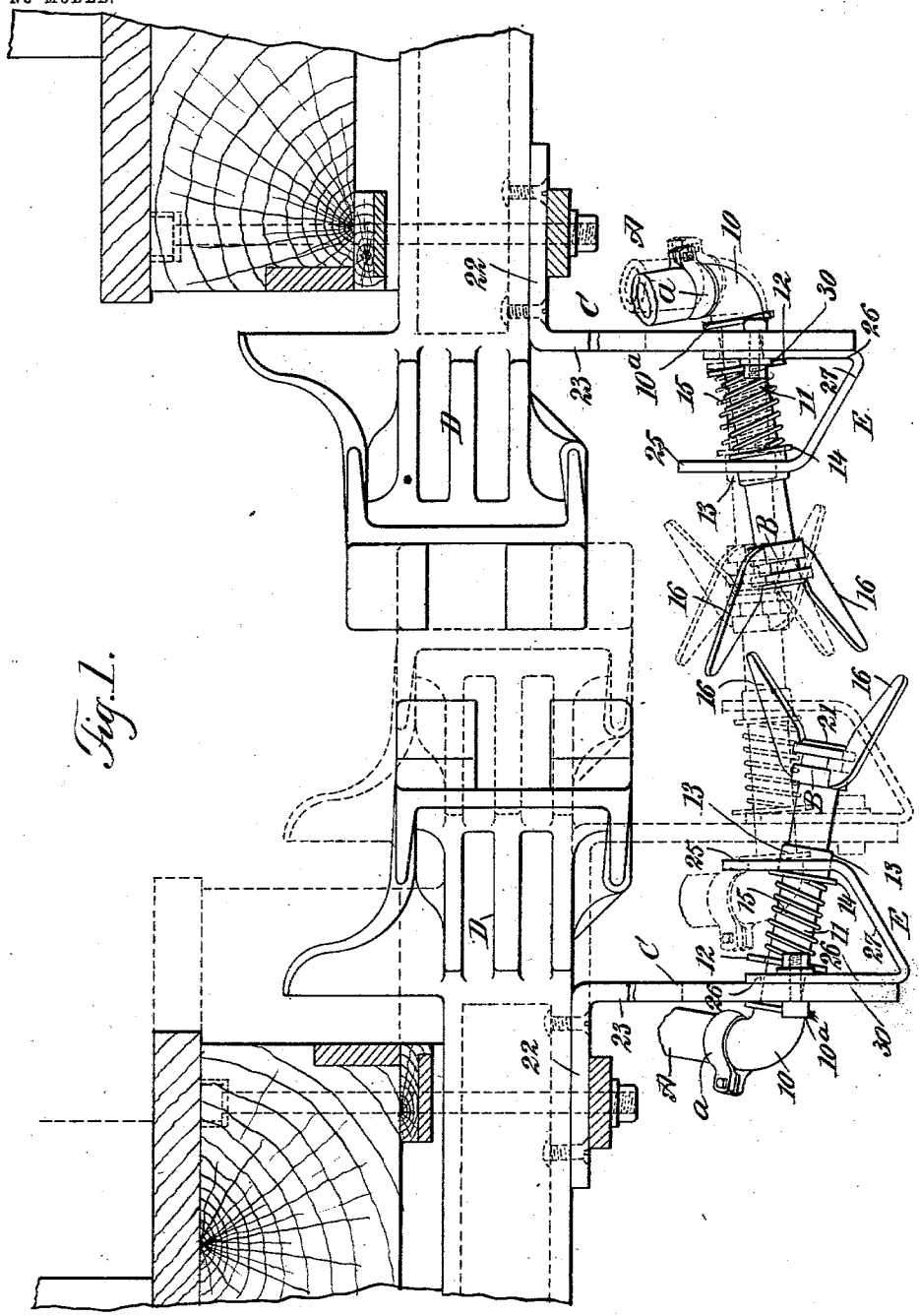

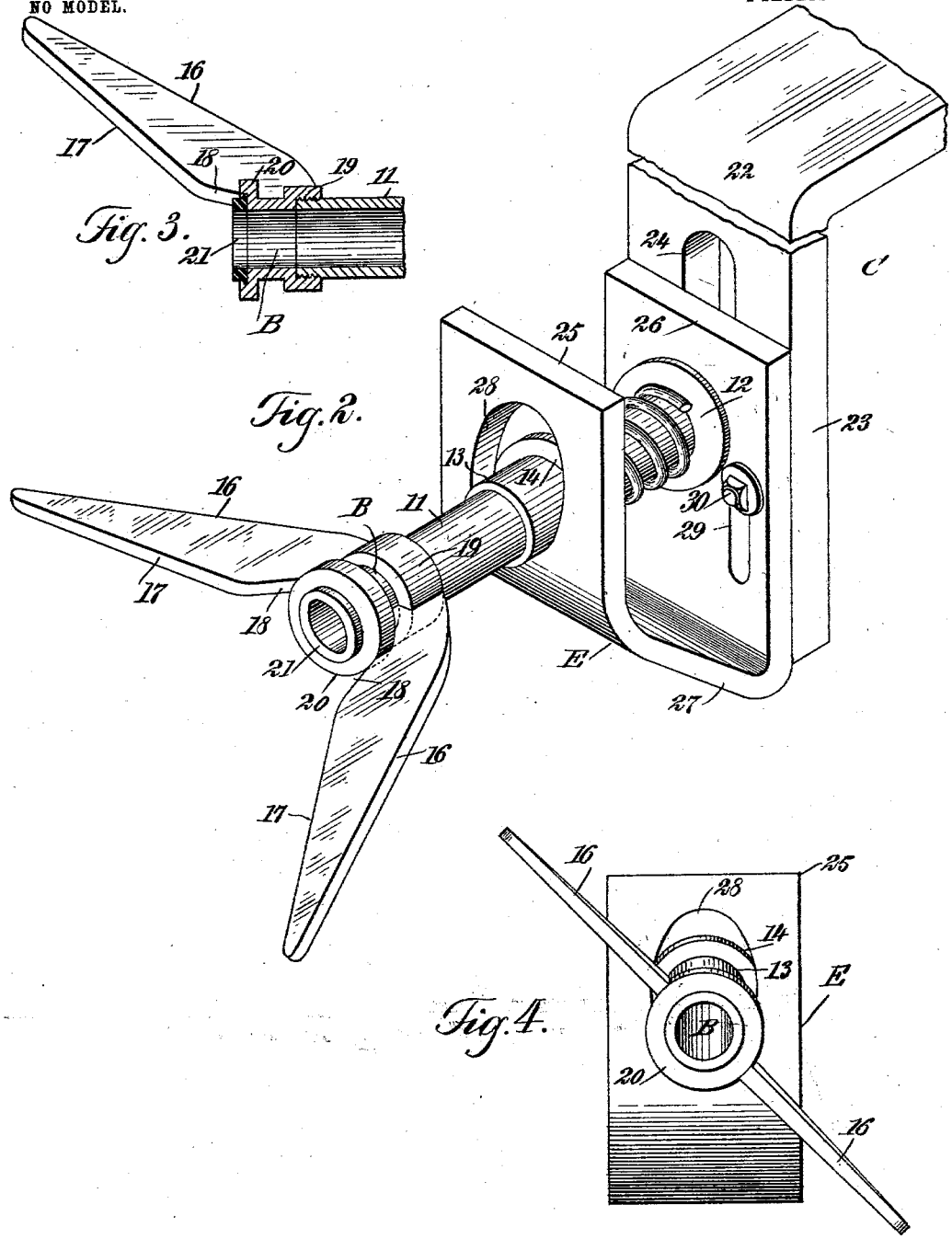

UNITED STATES PATENT OFFICE.

ARCHIBALD F. ALLAN AND JOHN A. LENHOFF, OF WILMINGTON, DELAWARE.

COUPLING FOR AIR-BRAKE HOSE.

SPECIFICATION forming part of Letters Patent No. 743,796, dated November 10, 1903.

Application filed December 19, 1902. Serial No. 135,832. (No model.)

*To all whom it may concern:*

Be it known that we, ARCHIBALD F. ALLAN and JOHN A. LENHOFF, citizens of the United States, and residents of Wilmington, in the county of Newcastle and State of Delaware, have invented a new and Improved Coupling for Air-Brake Hose, of which the following is a full, clear, and exact description.

The purpose of the invention is to provide a coupling for air-brake hose which will act automatically in coupling and uncoupling, effecting a coupling the moment two cars similarly equipped are brought together and an uncoupling the instant one car is drawn from the other, thereby obviating the necessity of and consequent danger to an attendant usually employed to effect air-brake couplings between cars, besides securing a great saving of time.

A further purpose of the invention is to provide a construction for automatic couplings for air-brake hose which when in coupled position relative to an opposing similar coupling will effect an air-tight connection and which will quickly release itself from its fellow the moment one car is separated from the other, thereby preventing the fracture of the hose, which frequently happens under the system of hand-coupling by reason of the brakeman or other attendant neglecting to uncouple the hose when the car is uncoupled.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a sectional side elevation of a portion of the opposing ends of two cars, a side elevation of the couplings for the cars, and a side elevation of the improved air-brake hose-couplings and their supports, the said hose-couplings being shown disconnected in positive lines and connected in dotted lines. Fig. 2 is a perspective view of the improved air-brake hose-coupling and support for the same. Fig. 3 is a longitudinal sectional view through the head or coupling end of the coupler, and Fig. 4 is a front elevation of the improved air-brake hose-coupling and its adjustable support.

A represents a line of rubber hose used in connection with an air-brake, which hose is carried to a stop-cock in the customary manner. Each terminal end of the hose A is connected by a clamp *a* with a metal elbow 10, having a flange 10ª at its outer end, and this elbow is secured in any suitable or approved manner to a terminal metal pipe 11 for the said hose A, it being understood that the construction is duplicated at each end of the said hose A. The pipe 11 is provided with a plate 12, which is slipped loosely on the pipe and which faces the flange 10ª of the elbow 10, said plate being parallel with the said flange, and a sleeve 13 is slipped over the terminal pipe 11 between its outer end and the plate 12. This sleeve 13 is provided at its rear or inner end with a flange 14, as is best shown in Figs. 1 and 2. A spring 15 is coiled around each terminal pipe 11 between the plates 12 thereon and the flanges 14 of the sleeves 13 and has bearing against the said plates and the said flanges, as is also shown in Figs. 1 and 2.

At the outer end of each terminal pipe 11 of a conducting-hose A a metal head B is screwed upon the said pipes 11. These heads are best illustrated in Fig. 3, and at opposite sides of each head B a guide-finger 16 is secured or made integral with the head. These guide-fingers diverge, extending outward in opposite directions, and are more or less tapering, and their inner longitudinal edges 17 incline from their outer contracted ends inwardly in direction of the head B. Where the said inclined surfaces 17 quite closely approach the head B, the inner longitudinal edges of the guide-fingers 16 are given an outward inclination in direction of the head, meeting the said head at its outer end portion, as is shown at 18 in Figs. 2 and 3.

Each head B consists of a body portion having a hub 19 formed at its inner end for attachment to a terminal pipe 11 and a flange 20 at its outer end, and the inner ends of the guide-fingers 16 are secured to the hubs, the flanges, and the bodies of the said heads B, as is best shown in Fig. 2. At the outer end of each head B a rubber gasket 21 is secured in any suitable or approved manner, and these gaskets 21 extend outward beyond the outer ends of the said heads B, as is clearly shown in Figs. 2 and 3. The guide-fingers 16 at opposite ends of the car are so arranged that the guide-fingers at one end will be practically opposite the space between the guide-fingers at the opposite end of the car, so that when two heads are brought together the guide-fingers of one head will ride up upon the flange 20 of the opposing head between the guide-fingers of said head, as is shown in dotted lines in Fig. 1, and in effecting a coupling between the air-brake hose of two cars the terminal sections 11 of the hose are carried from a normally downwardly and outwardly inclined position (shown in positive lines in Fig. 1) to a substantially horizontal position, (shown in dotted lines in the same figure,) and in this manner the gaskets 21 are forced so tightly together that they will make an air-tight connection between opposing coupled heads.

A hanger C is provided for each terminal section 11 of a conducting-hose A, and these hangers consist of upper horizontal members 22, attached to the under face of a coupling D for the car, as is shown in Fig. 1, and a vertical member 23, in which latter member a longitudinal slot 24 is produced. Each hanger C is adapted to carry a main support E for a terminal section 11 of a conducting-hose A, and, as is best shown in Fig. 2, each support E is substantially U-shaped in formation, comprising a front vertical member 25, a rear vertical member 26, and a bottom member 27, which latter member is shown as having a downward and inward inclination; but the bottom member of the support E may be made straight or otherwise formed, as desired.

A vertically-disposed oblong opening 28 is produced in the outer or front member 25 of each support E, and in the rear member 26 of each support E a corresponding circular opening is made of sufficient diameter to admit of the passage through it of an extension-pipe 11 of the conducting-hose.

The supports E are adjustably secured to the hangers C by means of bolts 30, which bolts are passed through apertures in the vertical members 23 of the hangers and through slots 29, vertically produced in the inner members 26 of the supports E at each side edge of said inner members, as is shown in Fig. 2. Thus it will be observed that the supports E may be raised and lowered as occasion may demand.

The extension terminal sections 11 of the conducting-hose A pass through the vertical openings 24 in the hangers C, thence through the openings in the inner members 26 of the supports E, and in front of these latter openings the plates 12, heretofore referred to, are located, one plate to each of the said extension terminal sections 11, and, further, the said extension terminal sections 11 are passed through the elongated or oval openings 28 in the outer or front members of the supports E, and the flanges 14 of the sleeves 13, located on the said terminal extensions 11, are made to engage with the rear faces of the said members 25 of the supports E, while the springs 15, coiled around the extension terminal sections 11 of the hose-pipes A, have bearing against the plates 12 and the said flanges 14, as is clearly shown in Figs. 1 and 2. As heretofore stated, the terminal sections 11 of the hose-pipes A have a downward and outward inclination.

It is impracticable to attach the hangers C to the body of a car, owing to the variations in the distance between the cars when they first collide and when they are at full tension. By attaching the hangers to the car-couplers D a fixed position is obtained for the air-brake hose-coupling, due to the fact that there is no fluctuation of any moment between the car-couplers, whereas between the body of the cars there is a fluctuation of about four inches. The inclination of the terminal extension pipes or members 11 from the hose A is in a downward direction or about one and a half inches from a horizontal line, for the following reasons: The distance from the track to the center of the coupling-heads of the hose A is to be kept standard when the car is unloaded. When the hose of two cars are being coupled together—one car being loaded and the other unloaded, for example—the coupling on the loaded car will posssibly be lower than the coupling of the unloaded car. Therefore the coupling of the loaded car will have to be raised, and this is accomplished by the guide-fingers of the loaded car riding up upon the flange 20 of the head of the coupling of the unloaded car. In performing the above operation the head of the coupling is practically the only part raised, simply tilting in its position, as the inner portion of the pipe extension 11 still rests upon the support E. When the couplings are placed in a horizontal line, one lower than the other, it is necessary for the lower one to be raised bodily into position, whereas by placing the couplings on an incline, as shown, this difficulty is overcome, and the lower coupling may be readily raised automatically. If by long and rough usage the car-body should sag down, it would naturally throw the couplings out of standard height; hence the adjustment of the supports E upon the hangers C.

It will be observed that the coupling-heads for the hose extend beyond the outer ends of the car-couplers in practice about one and a half inches. The object of so doing is to obtain the depression which is necessary to give the springs 15 sufficient resistance to hold the coupling-heads together without leaking. The springs 15 employed when depressed offer a resistance of one hundred pounds. Thus in coupling it will be observed that the springs in action offer a resistance of two hundred pounds at the point of contact of the coupling-heads B, and as there is maximum of pressure of but sixty pounds in the train-pipe it will be understood that there is no possibility of leakage. The guide-fingers 16 are shown at the top of the head to the right and at the bottom to the left when facing an end of the car. They are kept thus on all cars, and such position prevents the guide-fingers on one coupling-head B coming in contact with the guide-fingers on the opposing head. The coupling-heads B are held in normal position by the rigidity of the sections 11.

Having thus described our invention, we claim as new and desire to secure by Letters Patent—

1. In couplings for air-brake hose, a car-coupler, a hanger attached to the car-coupler, and a support for the air-brake hose adjustably attached to the hanger.

2. In couplings for air-brake hose, the combination, with the hose, of a terminal extension of rigid material, spring-controlled in a lateral direction, the terminal extension having normally a downward and forward inclination, a head for the said extension, and guide-fingers extending from opposite points of the said head, said guide-fingers extending also forwardly in opposite directions, their inner longitudinal edges being inclined inwardly in direction of the head, for the purpose described.

3. In couplings for air-brake hose, the combination with the hose, of a terminal extension of rigid material spring-controlled in a lateral direction, a head for the said extension, guide-fingers extending from opposite points on the said head, said guide-fingers extending also forwardly in opposite directions, their inner longitudinal edges being inclined inwardly in direction of the head, elastic gaskets located at the outer ends of the said coupling-heads, hangers adapted for attachment to the couplers of a car, and supports adjustable upon the said hangers, the said extensions from the air-brake hose passing through the hangers and supports and capable of movement therein, as described.

4. In couplings for air-brake hose, a coupling-head, comprising a body portion having a hub formed at its inner end for attachment to a terminal pipe and a flange at its outer end and guide-fingers extending from the exterior of the said body portion from opposite points and connected with the hub, flange and body portion, the said guide-fingers being tapering and extending from the said head in opposite directions, their inner longitudinal edges being oppositely beveled, as and for the purpose described.

5. In couplings for air-brake hose, a coupling-head, comprising a body portion having an internally-screw-threaded hub at its inner end, and a flange at its outer end, and guide-fingers extending from the exterior of the said body portion from opposite points and connected with the hub, flange and body portion between the hub and flange, the said guide-fingers being tapering and extending from the said head in opposite directions, their inner longitudinal edges being oppositely beveled for a portion of their length from the outer ends of the guide-fingers rearwardly and inwardly in direction of the head for a portion of the length of the fingers, and then inwardly and downwardly to a connection with the said head, as and for the purpose described.

6. In couplings for air-brake hose, the combination with a car-coupler, of a hanger secured to the car-coupler, which hanger is provided with a longitudinal slot, a support adjustably attached to the hanger, which support is substantially U-shaped in formation and is provided at its rear member with a circular opening and a corresponding elongated opening in its forward or outer member, an air-brake hose, a metallic extension from an end of the air-brake hose, which metallic extension is carried through the slot in the hanger and the openings in the said support, flanges carried by the said extension between the members of the said support, a spring coiled around the extension, bearing against the said flanges, and a head secured to the outer end of the said extension from the air-brake hose, an elastic gasket at the outer end of the head, and oppositely-disposed tapering guide-fingers secured exteriorly to the said head, which fingers diverge at their forward or outer ends, for the purpose described.

7. In couplings for air-brake hose, a hanger, a support adjustable upon the said hanger, a hose, an extension from the said hose, passed through the hanger and support and capable of movement in both, the said extension being longitudinally tension-controlled, the said extension having also a normal downward and forward inclination, and a coupling-head at the end of the said extension from the hose, as described.

8. In couplings for air-brake hose, a hanger, a support adjustable upon the said hanger, a hose, an extension from the said hose, passed through the hanger and support and capable of movement in both, the said extension being longitudinally tension-controlled, the said extension having also a normal downward and forward inclination, a coupling-head at the outer end of the extension from the hose, and guide-fingers located at the exterior of the said coupling-head, which guide-fingers diverge at their outer ends, for the purpose described.

9. In couplings for air-brake hose, a car-coupler, a hanger attached to the car-coupler, a support adjustable on the hanger, an air-brake hose, and a terminal extension of rigid material for the air-brake hose, the said extension passing through the said hanger and support and having spring-controlled movement therein, as set forth.

10. In couplings for air-brake hose, a hanger provided with a vertical slot, a substantially U-shaped support adjustably attached at its rear member to the hanger, the said rear member having a circular opening and the front member being provided with a vertically-arranged elongated opening, an air-brake hose, a metallic extension from one end of the hose, the said extension passing through the slot in the hanger and the openings in the support, a spring held on the extension between the front and rear members of the support and exerting tension on the said extension, and a coupling-head on the outer end of said extension, as set forth.

In testimony whereof we have signed our names to this specification in the presence of two subscribing witnesses.

ARCHIBALD F. ALLAN.
    JOHN A. LENHOFF.

Witnesses:
 JOHN R. WOODMANSEY,
 WILLIAM A. EHART.